United States Patent [19]

Kumagai et al.

[11] Patent Number: 5,742,378
[45] Date of Patent: Apr. 21, 1998

[54] ELECTRONIC LEVELING APPARATUS AND LEVELING STAFF USED WITH THE SAME

[75] Inventors: Kaoru Kumagai; Shinji Kawashima; Kiichi Furuya; Fumio Ohtomo, all of Tokyo, Japan

[73] Assignee: Kabushiki Kaisha TOPCON, Tokyo, Japan

[21] Appl. No.: 726,997

[22] Filed: Oct. 7, 1996

Related U.S. Application Data

[63] Continuation of Ser. No. 557,549, Nov. 14, 1995, abandoned, which is a continuation of Ser. No. 82,082, Jun. 23, 1993, abandoned.

[30] Foreign Application Priority Data

Jun. 24, 1992 [JP] Japan .................... 4-191696
Dec. 12, 1992 [JP] Japan .................... 4-353346
Dec. 12, 1992 [JP] Japan .................... 4-353347

[51] Int. Cl.$^6$ .................... G01C 3/08; G01C 15/02; G01B 11/00
[52] U.S. Cl. .................... 356/4.08; 33/293; 356/375; 356/401
[58] Field of Search .................... 33/293, 294; 250/201.7, 250/237.6; 356/4.08, 375, 400, 401

[56] References Cited

U.S. PATENT DOCUMENTS 4,488,050 12/1984 Iwafune .................... 250/578
4,715,714 12/1987 Gaechter et al. .................... 356/375
4,778,273 10/1988 Michel .................... 356/374

Primary Examiner—Stephen C. Buczinski
Attorney, Agent, or Firm—Brumbaugh, Graves, Donohue & Raymond

[57] ABSTRACT

An electronic leveling apparatus and associated leveling staff are designed to form an image of scale patterns of the leveling staff on a photo-electric transducer by means of a telescopic optical system, convert the image into an electrical signal with the transducer and implement the Fourier transformation for the signal with a signal processor, thereby having functions of focusing control and abnormality detection. The leveling staff has an alignment of the first and second (and third) scale patterns aligned in order cyclically at a constant pitch along the length measuring direction, with the first and second patterns having their widths varied in different cyclic periods and the third pattern having a constant width.

15 Claims, 13 Drawing Sheets

ELECTRONIC LEVELING APPARATUS AND LEVELING STAFF USED WITH THE SAME

This application is a continuation of application Ser. No. 08/557,549, filed on Nov. 14, 1995, now abandoned, which is a continuation of application Ser. No. 08/082,082, filed 23 Jun. 1993, now abandoned.

BACKGROUND OF THE INVENTION

The present invention relates to an electronic leveling apparatus and a leveling staff used with the same, and particularly to an electronic leveling apparatus and associated leveling staff operating to convert the image of scale patterns on the leveling staff into an electrical signal with a photo-electric transducer and implement the Fourier transformation for the signal, thereby accomplishing the focusing control and abnormality detection.

For the direct measurement of the leveling and the like, a set of leveling instrument and leveling staff has been used conventionally. Namely, the surveyor sights the scale on the leveling staff through the leveling instrument and measures the difference of height. However, this traditional leveling scheme involves the read error made by the surveyor. With the invention of overcoming the surveyor's read error, an electronic leveling apparatus (will be termed simply "electronic level") which reads the scale on the leveling staff electronically has been developed. This electronic leveling system is designed to emit an optical signal from the leveling staff and receive the optical signal on the leveling apparatus and read the scale of the leveling staff.

Although it is possible to apply the recent advanced image processing technology to electronical reading of the scale of leveling staff which varies in magnification depending on the distance, the processing for the scale pattern image takes an excessive time and therefore it lacks in practicability.

In dealing with this situation, there have been developed the electronic levels based on the first and second embodiments of the present invention, which are capable of reading the scale of leveling staff electronically through a simple signal processing even if the magnification of the scale varies depending on the distance. These electronic levels are operative to evaluate the difference of height automatically after the scale pattern image has brought to an in-focus state through the manual operation. The automatic focusing technique, which is generally based on the triangulation, is becoming prevalent recently. However, the automatic focusing control based on the triangulation necessitates its own control unit, resulting in an increased manufacturing cost.

Moreover, the above-mentioned electronic levels which rely on the manual focusing operation involve a problem of erroneous measurement due to incorrect sighting or incorrect focusing of the scale of leveling staff.

DESCRIPTION OF THE PREFERRED EMBODIMENTS

Embodiments of this invention will be explained with reference to the drawings.

[First Embodiment]

Figure 1:
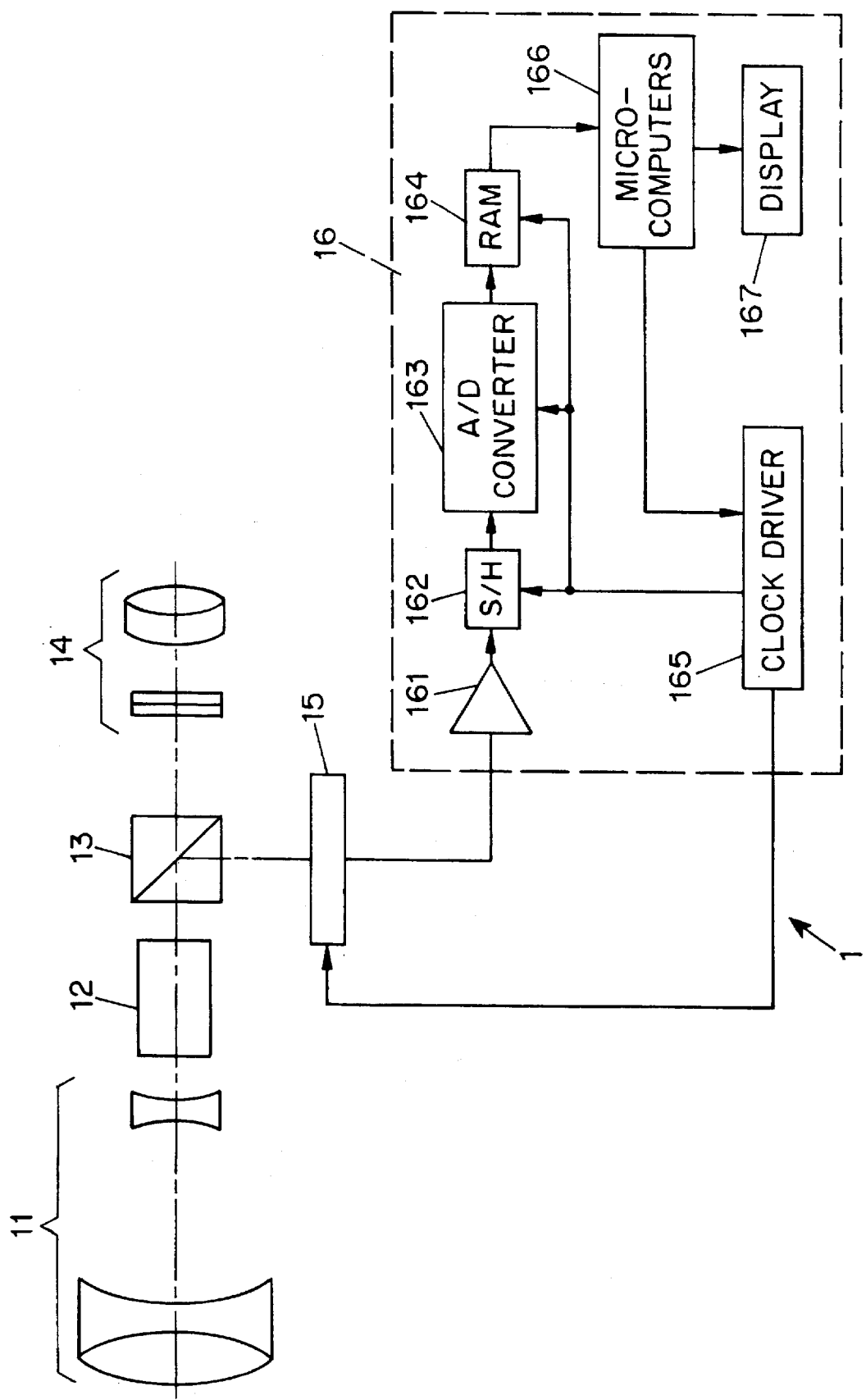
FIG. 1 is a block diagram showing the electronic level 1 based on the first embodiment of this invention.
Figure 2A:
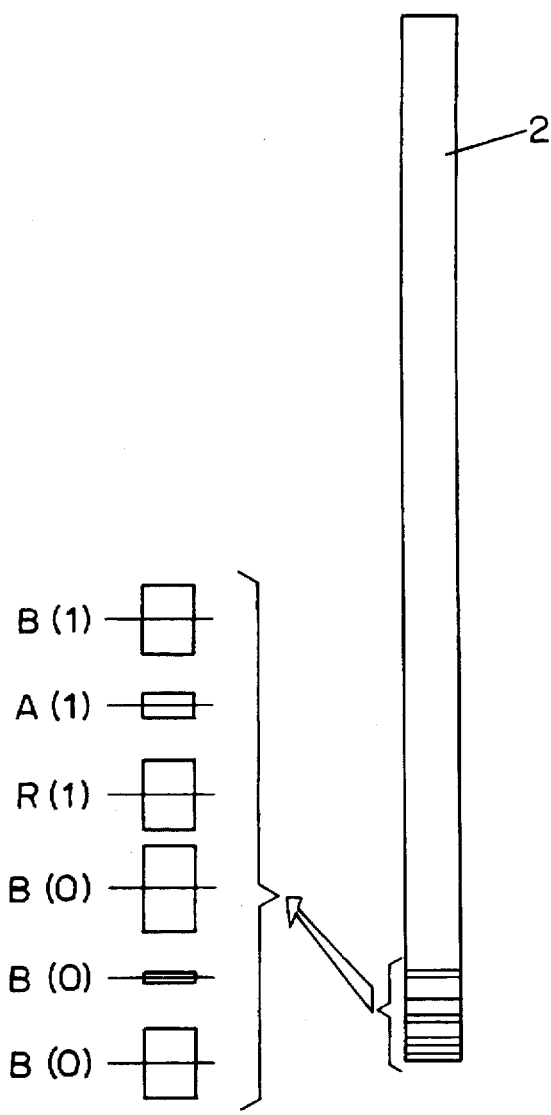
FIGS. 2(a), 2(b) and 2(c) are diagrams used to explain the leveling staff 2 used with the electronic level shown in FIG. 1.
Figure 2B:
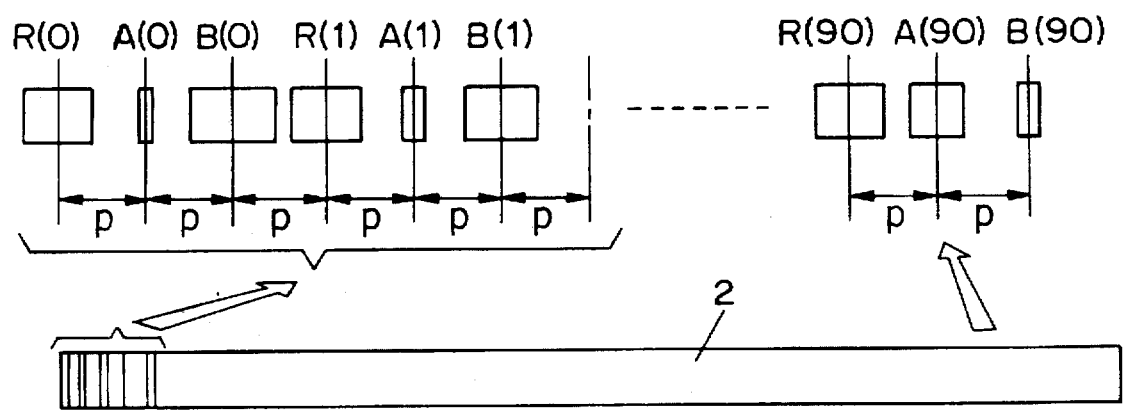
Figure 2C:
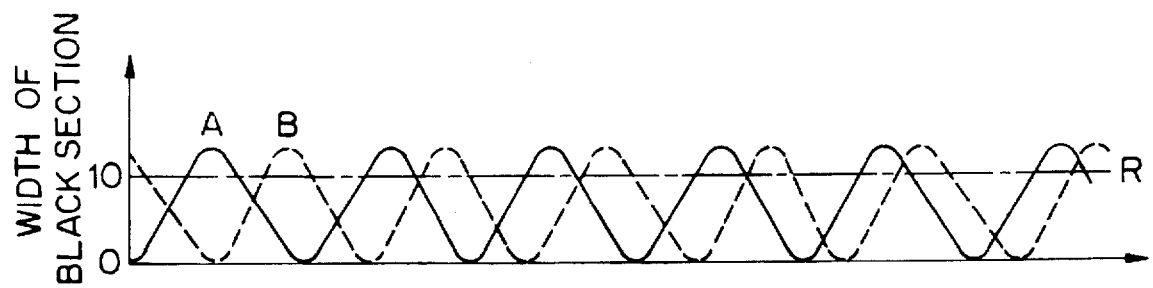
Figure 3:
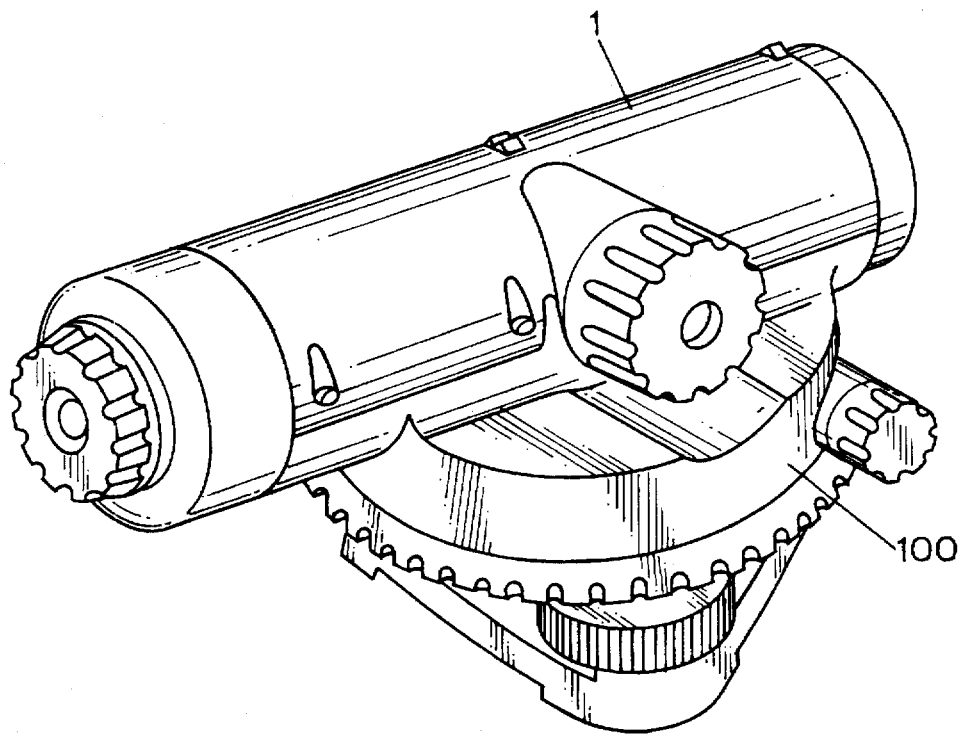
FIG. 3 is a perspective view of the electronic level 1 based on the first embodiment of invention.

The leveling system of this embodiment consists of an electronic level 1 and a leveling staff 2 as shown in FIG. 1 through FIG. 3. The electronic level 1 is mounted on a vernier portion 100 as shown in FIG. 3. It consists of an optical system including an objective lens portion 11, a compensator 12, a beam splitter 13, an eyepiece portion 14 and a linear sensor 15, and a computation means 16, as shown in FIG. 1.

The objective lens portion 11 forms the image of the scale pattern of the leveling staff. 2. The compensator 12 is an automatic mechanism for maintaining the sight line horizontal thereby to offset some inclination of the optical axis of the electronic level 1. The beam splitter 13 splits the incident light beam into two directions toward the eyepiece portion 14 and the linear sensor 15. The eyepiece portion 14 is used by the surveyor to sight the scale on the leveling staff 2. The linear sensor 15 is a pattern detector which converts the scale pattern image formed by the objective lens portion into an electrical signal. The linear sensor 15, which is a CCD linear sensor in this embodiment, can be any optical sensor having an array of photodiodes of at least one dimension.

The computation means 16 consists of an amplifier 161, a sample-and-hold circuit 162, an A/D converter 163, a RAM 164, a clock driver 165, a microcomputer 166, and a display portion 167.

The leveling staff 2 has a cyclic alignment of scale patterns at a constant pitch of p, with each pattern block consisting of a first pattern A, second pattern B and third pattern R, as shown in FIG. 2. That is to say, respective blocks consisting of 3 patterns are continuously formed. The leftmost pattern block is defined to be block 0 including R(0), A(0) and B(0), the next block is block 1 including R(1), A(1), B(1), the next block is block 2 including R(2), A(2), B(2), and so on. A reference signal is produced in correspondence to the constant pattern pitch p.

The pattern pitch is 10 mm in this embodiment, although it can be set arbitrarily. The third pattern R has a constant width of 8 mm for its black section, whereas the first pattern A has its width of black section modulated in a cyclic period of 600 mm and the second pattern B has its width of black section modulated in a cyclic period of 570 mm. The first pattern A and second pattern B may have arbitrary periodic width variations which are different slightly from each other. The first pattern A and second pattern B are modulated for their widths as shown in FIG. 2(b).

Next, the principle of measurement of the leveling system arranged as described above will be explained.

Initially, the measurement of horizontal position of the leveling staff 2 will be explained. Since the first pattern A is modulated for the width of black section in a period of 600 mm, the pattern width $D_A$ for a modulation width of 0–10 mm is expressed as follows.

$$D_A = 5 \times (1 + \sin(2 \times \pi \times X/600 - \pi/2)) \quad (1)$$

where X takes 10 mm, 40 mm, 70 mm, and so on. Similarly, the second pattern B modulated in a period of 570 mm has its pattern width $D_B$ expressed as follows.

$$D_B = 5 \times (1 + \sin(2 \times \pi \times X/570 + \pi/2)) \quad (2)$$

where X takes 20 mm, 50 mm, 80 mm, and so on.

The first and second patterns are modulated with offset phases of $\pm\pi/2$ with the intention of simplifying the separation of the signals resulting from these patterns.

Since the first pattern A and second pattern B have slightly different periods, the same pattern appears at the distance which is the minimum common multiple of the periods, i.e., at a distance of 11400 mm which is the minimum common multiple of 600 mm and 570 mm in this embodiment. Accordingly, the signals produced from the first and second patterns have phase differences varying between 0 and $2\pi$ over the range of 0–11400 mm.

For the signals of the first and second patterns having phases of $\phi_A$ and $\phi_B$, respectively, the horizontal position H of the leveling staff 2 is expressed as follows.

$$H = 11400 \times ((\phi_B - \phi_A - \pi)/(2\pi)) \text{ mm} \quad (3)$$

Next, the computation of the distance between the electronic level 1 and leveling staff 2 will be explained.

The electronic level 1 reads the scale on the leveling staff 2, and the resulting signal is rendered the Fourier transformation. As shown in the power spectrum graph of FIG. 4, signal components are separated into a frequency component of the reference signal corresponding to the pattern pitch p, a frequency component of the first pattern A, a frequency component of the second pattern B, and a frequency component (having a period three times that of the reference signal) of a set (block) of the third pattern R, first pattern A and second pattern B. These spectral frequencies move downward as the distance between the electronic level 1 and leveling staff 2 reduces. Among the all signal components, the reference signal has the smallest period (it corresponds to the constant pattern pitch p).

Since the pattern pitch p is fixed, the distance between the electronic level 1 and leveling staff 2 can be calculated based on the formula of lens focus.

Figure 5:
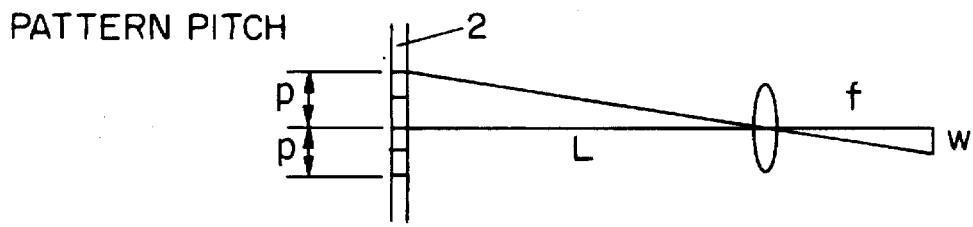
FIG. 5 is a diagram explaining the principle of distance measurement based on the first embodiment of invention.

Namely, as shown in FIG. 5, the lens produces an image width of w for the pattern pitch p, and the distance L between the level 1 and staff 2 is calculated from the distance d between the lens and image as follows.

$$L = d(p/w)$$

Since d is approximately equal to the focal distance f of the lens, $$L = d(p/w) = f(p/w)$$

With the linear sensor 15 having a pixel length of C and an output wavelength of k corresponding to the pattern pitch p, the image length w produced by the lens is expressed as w=Ck. Accordingly, the distance L between the level 1 and staff 2 is calculated approximately as follows.

$$L = ((f/C \times k)) \times (p) \quad (4)$$

Next, the principle of leveling will be explained.

Figure 6:
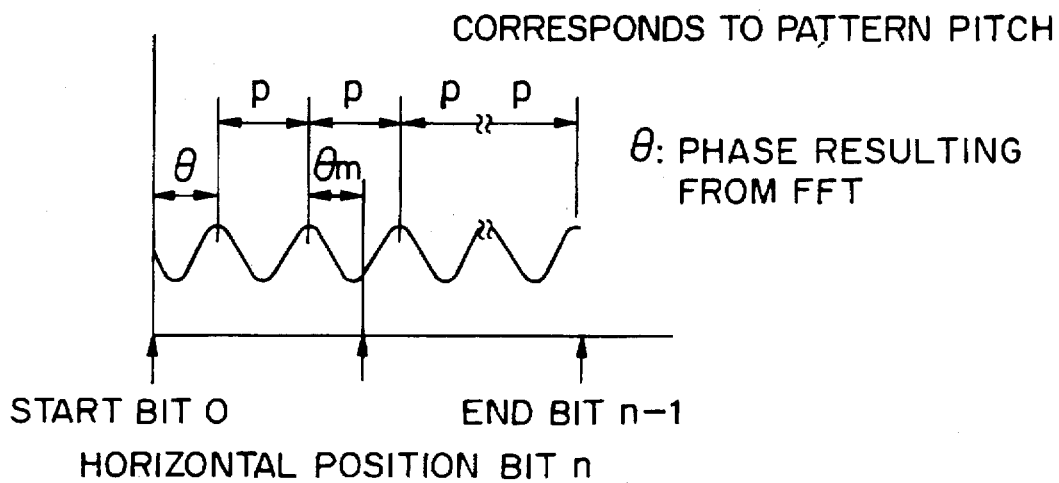
FIG. 6, FIG. 7 and FIG. 8 are diagrams used to explain the principle of long-distance measurement based on the first embodiment of invention.

The first case is the long-distance leveling. The Fourier transformation for the output signal of the linear sensor 15 produces a signal which reflects the pattern pitch p, as shown in FIG. 6. For a phase $\theta$ resulting from the Fast Fourier transformation and a phase $\theta_m$ at the position on the linear sensor 15 (the m-th bit) which corresponds to the horizontal position, the horizontal position $H_1$ within the pitch p can be calculated accurately as follows (fine measurement).

$$H_1 = (\theta_m/360°) \times p \quad (5)$$

In order to measure the horizontal position, it is necessary to obtain the approximate position of the pitch p counted from the pattern starting position on the leveling staff 2. Initially, the output signal of the linear sensor 15 is integrated for the former and latter half pitches of the reference signal (it corresponds to the pattern pitch p). Extracting the integrated value at every third pulse (product detection) produces a signal 1 for the first pattern A, a signal 2 for the second pattern B and a signal 3 for the third pattern R, as shown in FIG. 7. The third pattern R of 8 mm is not modulated, whereas the first pattern A and second pattern B are modulated in a depth of 10 mm, and therefore the third pattern signal 3 having a virtually constant integrated value has a level of about 80% with respect to the signals 1 and 2.

Figure 8:
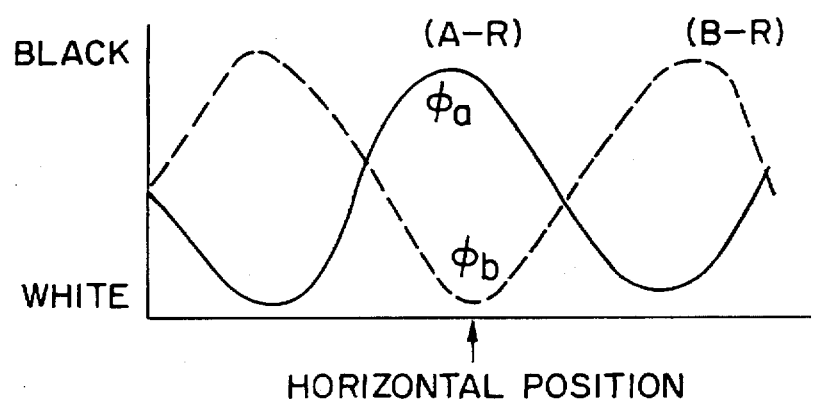

Since the third pattern R, first pattern A and second pattern B are placed in a predetermined order cyclically, each extracted signal can be identified among the patterns. In order to remove the influence of optical disturbances such as the shading, differential signals A-R and B-R are produced on the basis of the signal of third pattern R, as shown in FIG. 8.

Subsequently, by selecting a set of signals R, A-R and B-R including the reference signal which includes the bit position (m-th bit) on the linear sensor 15 corresponding to the horizontal position and evaluating the phases of the A-R and B-R signals, it is possible to determine at which position on the leveling staff 2 is the combination of the first pattern A, second pattern B and third pattern R derived from.

For the A-R signal of level Am having a half-peak amplitude Wa and the B-R signal of level Bm having a half-peak amplitude Wb, these signals A-R and B-R have their phases expressed as follows.

$$\phi_a = \sin^{-1}(Am/Wa) \quad (6)$$

$$\phi_b = \sin^{-1}(Bm/Wb) - 2\times\pi(10/570) \quad (7)$$

The reason for the second term of the expression (7) is that the position of the signal for the second pattern B has a 10 mm shift from that of the first pattern A.

By putting the expressions (6) and (7) into the expression (3), the horizontal position on the leveling staff 2 for the signal of the first pattern A can be calculated. In case the reference signal including the horizontal position belongs to the third pattern R, 10 mm is subtracted from the calculated horizontal position, or in case it belongs to the second pattern B, 10 mm is added to the calculated horizontal position. As a result, the approximate level $H_2$ of the horizontal position is obtained (coarse measurement).

In summary, the level H is measured by evaluating the phase of the reference signal at the horizontal position (fine measurement), determining the position of the reference signal for the horizontal position with respect to the pattern starting position on the leveling staff 2 based on the phase difference between the first pattern A and second pattern B (coarse measurement), and merging the fine measurement result $H_1$ and coarse measurement result $H_2$.

Next, the case of the short-distance measurement will be explained. Clear images of the first pattern A, second pattern B and third pattern R are produced in this case, and therefore more accurate leveling is expected through the direct measurement of the signal amplitude, instead of the product detection following the Fourier transformation which is the case of the long-distance measurement.

Figure 9:
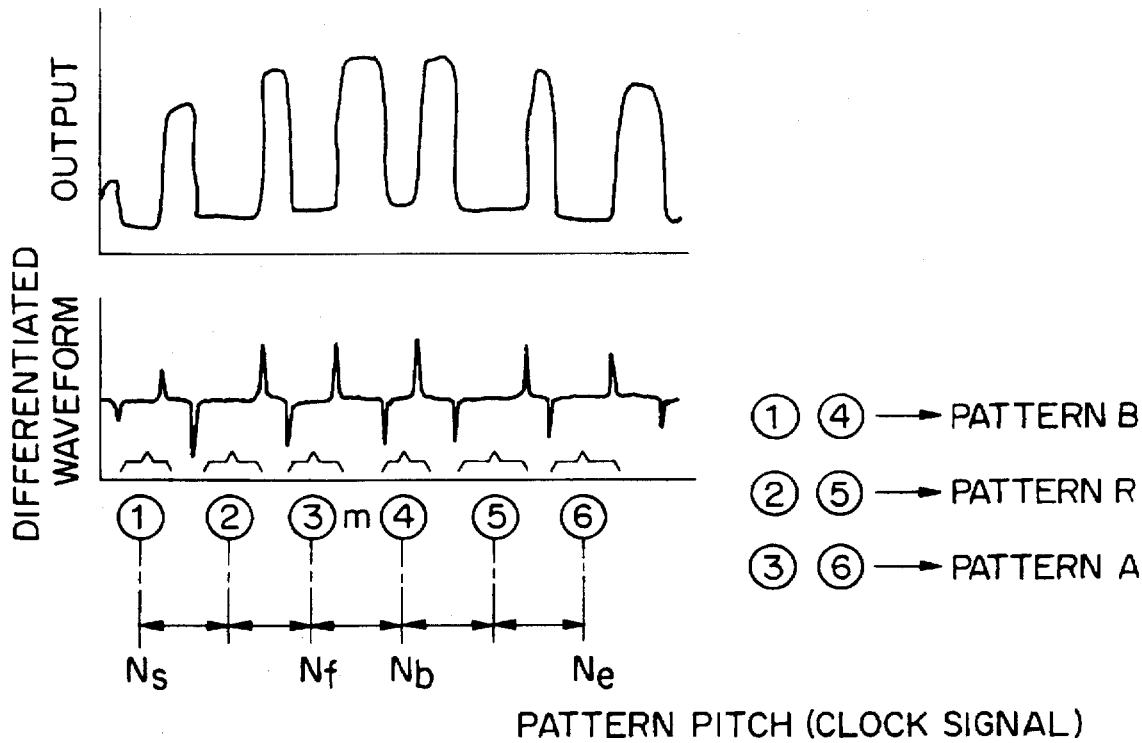
FIG. 9 is a diagram explaining the principle of short-distance measurement based on the first embodiment of invention.

Initially, the output signal of the linear sensor 15 is differentiated thereby to detect the rising edges and falling edges of the signal, as shown in FIG. 9. The width of black section of each pattern can be evaluated from the edges of the signal. Next, the central bit position of each black section is determined. A signal which represents the bit interval becomes the reference signal reflecting the constant pitch p of the first pattern A, second pattern B and third pattern R.

Since the period of the reference signal corresponds to 10 mm on the leveling staff 2, the positions of reference signals $N_f$ ($N_f$-th bit) and $N_b$ ($N_b$-th bit) at the front and back of the bit position (m-th bit) for the horizontal position (fine measurement) are expressed as follows.

$$H_1 = ((m-N_f)/(N_b-N_f))\times 10 \quad (8)$$

For reference signals of n in number between the start position $N_s$ and end position $N_e$, the average interval k of reference signals is calculated by $$k = (N_e - N_s)/n$$

By putting the resulting value of k into the expression (4), the approximate distance between the electronic level 1 and leveling staff 2 can be obtained.

By extracting every third black section from the beginning and recognizing the third pattern R which is constant in width among the orderly alignment of the third pattern R, first pattern A and second pattern B, the correspondence of the extracted sections to the patterns R, A and B is determined.

Subsequently, determination is made as to which pattern among R, A and B and which pattern block does the reference signal that includes the bit position (m-th bit) of the linear sensor 15 for the horizontal position belong, e.g., the n-th block in the case of R(n), A(n) and B(n).

By substituting the $$D_A = 5* (1+SIN (2*\pi*Xa/600-\pi/2))$$

$$Xa = 30\times n+10$$

to the expression (1) for $D_A$, the value of n can be calculated from the $D_A$ as follows.

$$n = (10/\pi)\times(\phi_a+(\pi/2))-(\tfrac{1}{3}) \quad (9)$$

$$\phi_a = \sin^{-1}((D_A/5)-1)$$

One of two values of $\phi_a$ existing between 0 and $2\pi$ is selected based on the condition that n is an integer. This pattern block, with a block number na being given, exists at a 600 mm interval (i.e., every 20th block) on the leveling staff 2, and the n is calculated by $$n = 20\times d+na$$

where d takes 0, 1, 2, 3, and so on.

The width $D_B$ of the second pattern B is calculated by using the resulting value of n.

By substituting the $$X = 30\times n+20$$

to the expression (2) and comparing the $D_B$ with the above calculation results of $D_B$, the block number n at which both $D_B$ values coincide is detected. The approximate level $H_2$ (coarse measurement) is calculated in one of the following three cases depending on as to which of the third pattern R, first pattern A and second pattern B do the determined n and m belong.

For the third pattern R:

$$H_2 = 30\times n$$

For the first pattern A:

$$H_2 = 30\times n+10$$

For the second pattern B:

$$H_2 = 30\times n+20 \quad (10)$$

Through the determination based on a few additional sets of patterns at the front and back of the inherent pattern set, the measurement error caused by a contaminated scale can be minimized.

In summary, the level H is obtained by producing the reference signal from the width of black sections of patterns R, A and B and determining a reference signal for the bit position corresponding to the horizontal position thereby to obtain a fine measurement result $H_1$, obtaining a coarse measurement result $H_2$ based on the phase difference between the signals of the first pattern A and second pattern B, and merging the fine measurement result $H_1$ and coarse measurement result $H_2$.

Although the foregoing measuring method is designed to distinguish signals of the modulated first pattern A and second pattern B based on the unmodulated third pattern R, the measurement without using the third pattern R is possible if the first pattern A and second pattern B can be identified based on other scheme, such as detecting the wavelengths of sensor output signals derived from both patterns.

Next, the details of the computation means 16 which is included in the electronic level 1 will be explained. In FIG. 1, the amplifier 161 amplifies the signal produced by the linear sensor 15, and the sample-and-hold circuit 162 samples and holds the amplified signal in response to the timing signal provided by the clock driver 165. The A/D converter 163 converts the voltage signal held by the sample-and-hold circuit 162 into digital data, the RAM 164 stores the data, and the microcomputer 166 implements various computational processes.

Figure 10:
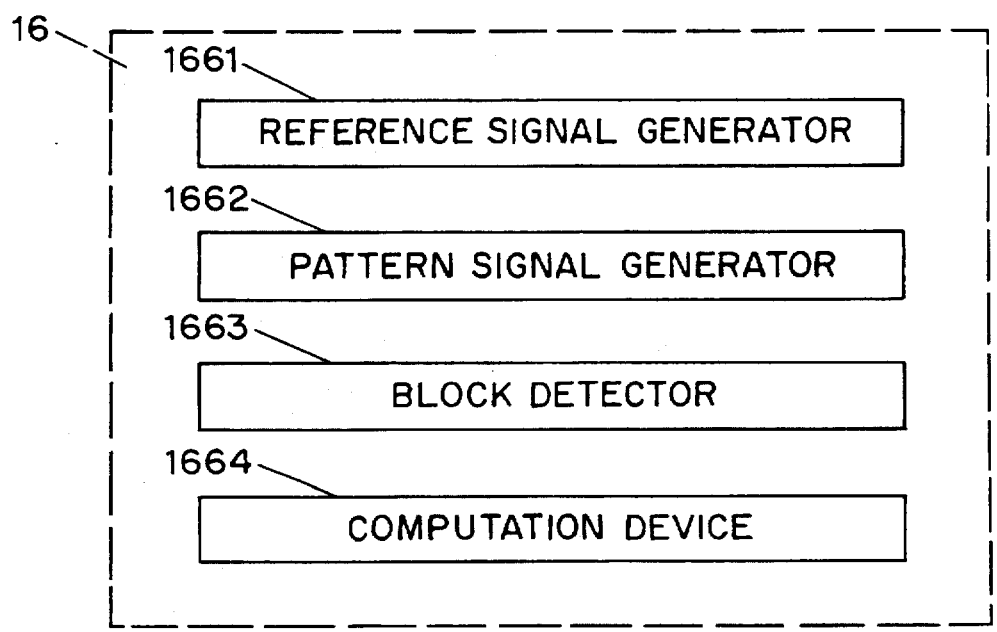
FIG. 10 is a block diagram showing the arrangement of the computation means 16 based on the first embodiment of invention.

The functions of the microcomputer 166 will be explained with reference to FIG. 10. The computation means 16 consists of a reference signal generator 1661, a pattern signal generator 1662, a block detector 1663, and a computation portion 1664. The reference signal generator 1661 produces a reference signal which represents the pattern pitch p through the Fast Fourier transformation in the case of the long-distance measurement, or produces a reference signal from the rising and falling edges of the output signal of the linear sensor 15 through the differentiating operation for the signal in the case of the short-distance measurement.

The pattern signal generator 1662 integrates the linear sensor output for the former and latter half pitches of the reference signal and extracts every third integrated value (product detection) thereby to produce a first pattern signal and second pattern signal in the case of the long-distance measurement, or produces the first pattern signal and second pattern signal directly through the extracting operation in the case of the short-distance measurement.

The block detector 1663 compares the width $D_A$ of the first pattern A with the width $D_B$ of the second pattern B thereby to determine the block number in the case of the short-distance measurement.

The computation portion 1664 calculates the difference of height based on the phases of the first pattern signal and second pattern signal at a position of the sight line in the case of the long-distance measurement, or calculates the difference of height based on the identified block in the case of the short-distance measurement.

The computation means 16 also has a function of distance measurement, and it is capable of calculating the approximate horizontal distance between the electronic level 1 and leveling staff 2 through the calculation of the expression (4).

The display portion 167, which may be a liquid crystal panel, displays the difference of height calculated by the computation portion 1664. The calculation result may be delivered to an external memory means or the like.

Next, the operation of the first embodiment of invention arranged as described above will be explained in detail on the flowchart of FIG. 11.

In step 1, the leveling staff 2 is placed at the position of measurement and the electronic level 1 is turned on to start the measurement. In step 2, the linear sensor 15 converts the image of the third pattern R, first pattern A and second pattern B of the leveling staff 2 imaged by the objective lens portion 11 into an electrical signal. In step 3, the electrical signal produced by the linear sensor 15 is rendered the A/D conversion, and the resulting digital data is stored in the RAM 164 in step 4. In step 5, the electrical signal from the linear sensor 15 is rendered the fast Fourier transformation (FFT). Another spectrum analyzing technique such as the maximum entropy method (MEM) or the like may be used instead of the FFT.

In step 6, a spectrum with the highest frequency among those obtained in step 5 is selected as the reference signal. In step 7, the approximate distance between the electronic level 1 and leveling staff 2 is calculated based on the expression (4).

In step 8, the measurement mode, i.e., short-distance or long-distance measurement, is determined from the calculation result of step 7. In this embodiment, a distance of 10 m or less is categorized to be a short distance, although it may be altered arbitrarily.

In the case of the long-distance measurement judged in the step 8, the sequence proceeds to step 9, in which the output signal of the linear sensor 15 is integrated for the half pitch length at the front and back of the reference signal. In step 10, every third integrated value is extracted (product detection) so that the signal 1 of the first pattern A, the signal 2 of the second pattern B and the signal 3 of the third pattern R are separated. In step 11, each signal is determined to be of the first pattern A, second pattern B or third pattern R based on the fact that the signal 3 of the third pattern R has a virtually constant integrated value which is about 80% of the signals 1 and 2 and that these three patterns appear in order. In step 12, the phases $\phi_A$ and $\phi_B$ are calculated based on the expressions (6) and (7), and the calculation results are put into the expression (3) to calculate the coarse level $H_2$ in step 13.

In step 14, the fine level $H_1$ is calculated based on the expression (5), and the fine level $H_1$ and coarse level $H_2$ are merged to obtain the level H in step 15. The step 15 tests the condition of completion of measurement.

In the case of the short distance measurement judged in the step 8, the sequence proceeds to step 16, in which the output signal of the linear sensor 15 is differentiated to detect the rising and falling edges of the signal. In the next step 17, the width between the edges of the black section is measured to determine the bit position corresponding to the center of the black section. In step 18, the reference signal which represents the pattern pitch is formed from the result of the step 17.

In step 19, the fine level $H_1$ is calculated based on the expression (8), and in step 20, every third width of black section is extracted and the third pattern R with the constant pattern width is recognized. In step 21, all of the third pattern R, first pattern A and second pattern B are determined based on the orderly alignment of patterns.

In step 22, the block number of the reference signal for the horizontal position is determined based on the expression (9), and the coarse level $H_2$ is calculated based on the expression (10) in step 23. In step 15, the fine level $H_1$ and coarse level $H_2$ are merged to obtain the level H, and the end of measurement is judged. In the case of the completion judged in step 15, the sequence proceeds to step 24 to terminate the operation, or otherwise the sequence returns to step 2.

In step 12, the difference of height with respect to the position determined in step 11 is calculated and the result is displayed on the display portion 167. The subsequent step 13 judges the end of measurement. In the case of the end of measurement, the sequence proceeds to step 14 to terminate the operation, or otherwise the sequence returns to step 2 to repeat the measuring operation.

As an alternative system design, the difference of height is calculated from the level H by the computation portion 1664, with the result being displayed on the display portion 167.

[Second Embodiment]

The second embodiment of this invention will be explained. This embodiment is intended to use only the modulated first and second patterns A and B for the measurement, while disusing the third pattern R. The signals of the first and second patterns are distinguished based on their wavelengths.

Figure 12:
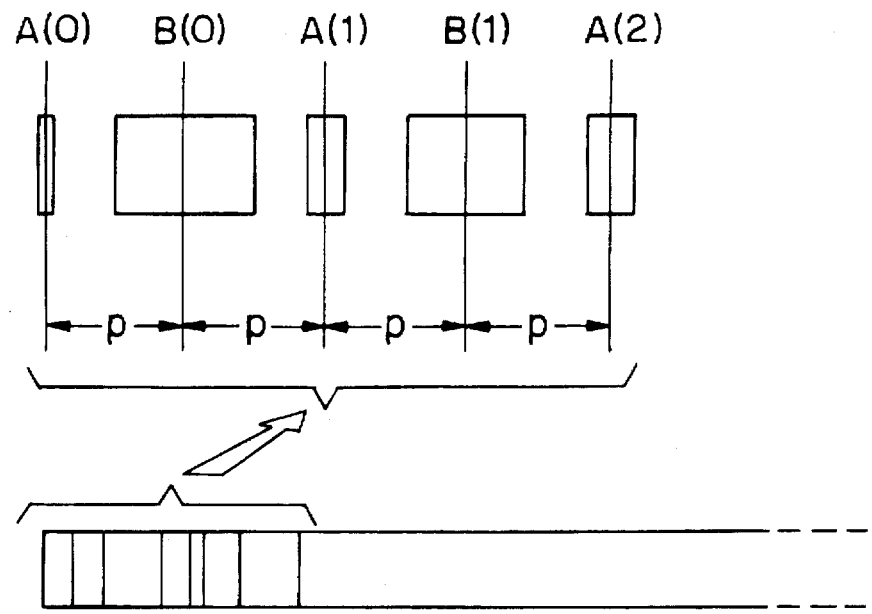
FIG. 12 is a diagram showing the scale pattern on the leveling staff based on the second embodiment of this invention.

The leveling staff 2 used in this embodiment is shown in FIG. 12, on which the first pattern A and second pattern B are aligned cyclically at a constant pitch p, and it differs from the counterpart of the first embodiment in the absence of the third pattern R.

Next, the signal processing will be explained only for portions different from the first embodiment. The distance between the electronic level 1 and leveling staff 2 is calculated also in this embodiment. In the long-distance measurement, fine measurement is carried out in the same manner as the first embodiment. For coarse measurement, the output signal of the linear sensor 15 is integrated and every second integrated value is extracted in the signal extraction process of step 10 in FIG. 11 thereby to obtain the signal 1 of the first pattern A and the signal 2 of the second pattern B.

These signals are detected for at least one period because of the long-distance measurement, and a pattern identifier distinguishes these signals based on the period, i.e., the signal 1 of the first pattern A has a longer period and the signal 2 of the second pattern B has a shorter period. Following the distinction between the signal 1 and signal 2, their phases $\phi_A$ and $\phi_B$ are evaluated and the coarse level is merged with the fine level to obtain the level. The function of pattern identifier is accomplished by the computation means 16.

Figure 11:
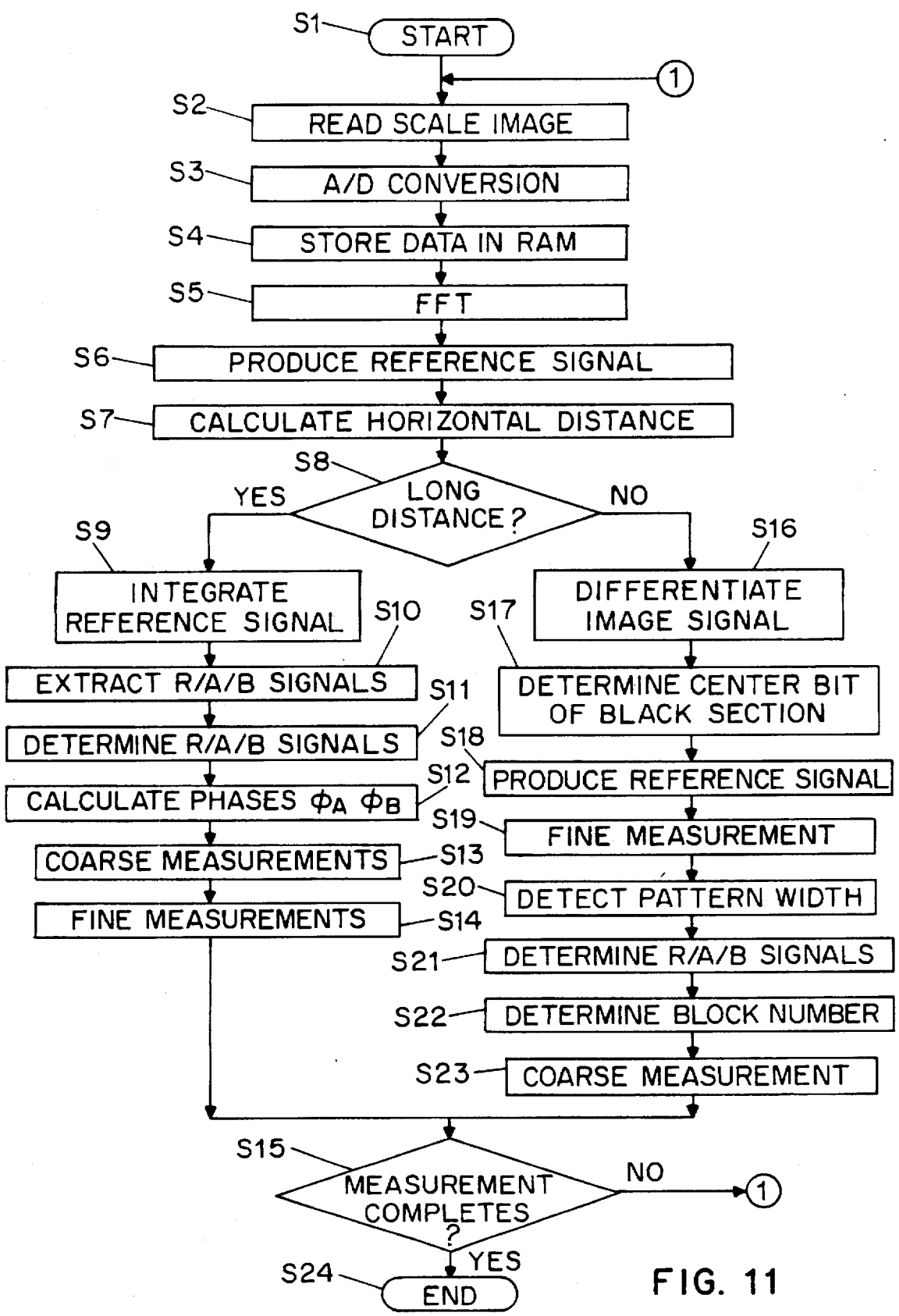
FIG. 11 is a flowchart used to explain the operation of the first embodiment of invention.

In the short-distance measurement, the pattern pitch on the linear sensor 15 of the electronic level 1 is correspondent to w in the signal identification step 21 of FIG. 11, and the signal 1 of the first pattern A and the signal 2 of the second pattern B are distinguished based on the amount of variation in width of each signal and the period of the reference signal. Specifically, for the first pattern having a period of 600 mm and the second pattern having a period of 570 mm, their pulse widths are calculated in the same manner as the expressions (1) and (2) as follows.

$$D_A = 5 \times (1 + \sin(2 \times \pi \times Xa/600 - \pi/2)) \quad (11)$$

where $$Xa = 20 \times n$$

$$D_B = 5 \times (1 + \sin(2 \times \pi \times Xb/570 + \pi/2)) \quad (12)$$

where $$Xb = 20 \times n + 10$$

and n is the block number taking 0, 1, 2, and so on.

By reforming the above expressions, the value of n is calculated from $D_A$ as follows.

$$n = (15/\pi) \times (\phi_A + \pi/2) \quad (13)$$

where $$\phi_A = \sin^{-1}(D_A/5 - 1)$$

Alternatively, the value of n is calculated from $D_B$ as follows.

$$n = (57/4\pi) \times (\phi_B - \pi/2) - (1/2) \quad (14)$$

where $$\phi_B = \sin^{-1}(D_B/5 - 1)$$

The first pulse width of the detected signal is $D_A$, and the value of n is calculated by the expression (13). In this case the block number to be selected is within the period of 600 mm. Among two possible values of n, one is selected based on the comparison of the first and second pulse widths. Subsequently, the pulse width $D_{A+1}$ for n+1 is calculated by the expression (11). Similarly, the value of n for the case of the first pulse width $D_B$ is calculated, and from it $D_{B+1}$ is calculated. If the pulse width next to the first pulse width is nearer to $D_{A+1}$, the first pulse width is determined to be of the pattern A, or if it is nearer to $D_{B+1}$, the first pulse width is determined to be of the pattern B.

Following the discrimination of the signals 1 and 2, the block number is determined in the same manner as the first embodiment, and the coarse level is merged with the fine level to obtain the level.

The remaining portion of the second embodiment is identical to the first embodiment, and explanation thereof is not repeated.

Although in the first and second embodiments of invention, the first and second patterns are formed based on the spatial modulation, with the pattern width being varied, the present invention is not confined to this scheme, but the pattern concentration may be varied for modulation, instead of varying the pattern width.

In the foregoing first and second embodiments of invention, the first and second patterns (and the third pattern in the first embodiment) are aligned in order cyclically at a constant pitch along the length measuring direction, with the first and second patterns having pattern widths which vary in different periods and the third pattern having a constant pattern width. In the electronic level 1 the pattern detector reads the first and second patterns (and the third pattern in the first embodiment), the reference signal generator produces a reference signal from the signal detected by the pattern detector, the pattern signal generator produces the first and second pattern signals from the reference signal and the detected signal, and the computation portion calculates the difference of height from the phases of the first and second pattern signals at a position in the neighborhood of the sight line. Consequently, such computation as mutual correlation is not needed, and the measurement time is reduced.

Furthermore, in the electronic leveling apparatus based on the first and second embodiments of invention, the reference signal generator produces the reference signal from the pulse width of the signal detected by the pattern detector, the block detector determines the pattern block, in which the sight line is included, based on the pattern widths of the first and second pattern signals at a position in the neighborhood of the sight line, and the computation portion calculates the difference of height based on the determined pattern block.

The electronic leveling apparatus based on the first and second embodiments of invention are also operative with the computation portion to calculate the difference of height based on the determined pattern block in the case of a short distance to the leveling staff or calculate the height difference based on the phases of the first and second pattern signals at a position in the neighborhood of the sight line in the case of a long distance to the leveling staff.

Moreover, the second and third patterns on the leveling staff are modulated in a constant period, and therefore it is not necessary to store and calculate entire information, and the electronic leveling apparatus can be configured in a relatively simple hardware structure.

In the first embodiment of invention, the leveling staff has the third pattern of a constant pitch in addition to the first and second patterns, with these patterns being formed in order cyclically at a constant pitch, and the electronic level includes the pattern identifier, by which the first and second patterns can readily be distinguished based on the third pattern signal with the constant period among the signals detected by the pattern detector.

[Third Embodiment]

The third embodiment of this invention will be explained with reference to the drawings.

Figure 13:
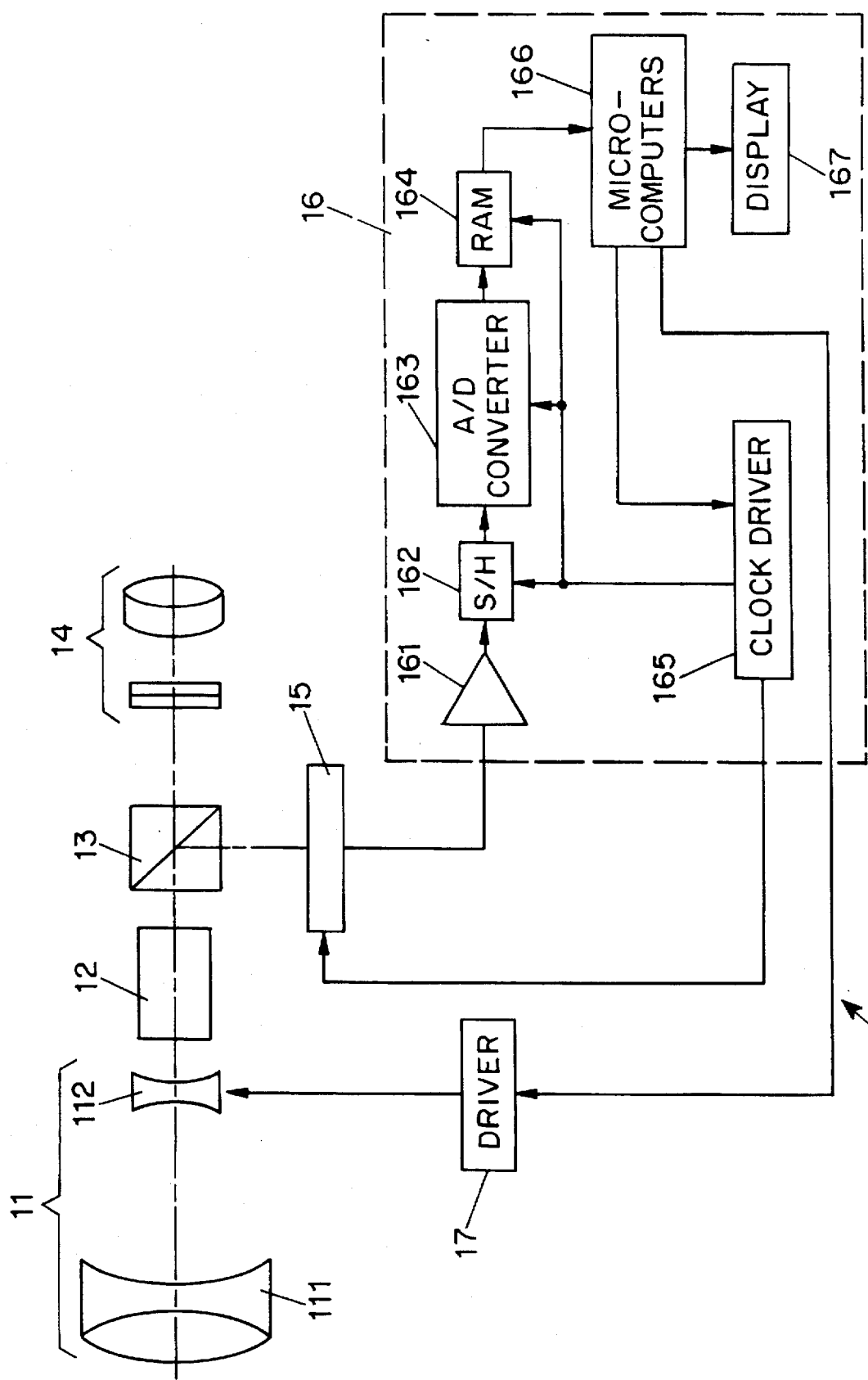
FIG. 13 is a block diagram showing the arrangement of the electronic level 1 based on the third embodiment of this invention.

The apparatus of this embodiment consists of an objective lens portion 11, a compensator 12, a beam splitter 13, an eyepiece portion 14, a linear sensor 15, a computation means 16, and a driver 17, as shown in FIG. 13.

The objective lens portion 11 for forming the pattern image of the leveling staff 2 consists of an objective lens 111 and an internal lens 112, functioning as a focusing part, which functions to focus the pattern image of the leveling staff 2 by being moved by the driver 17.

The driver 17 operates in accordance with the result of computation provided by the computation means 16 to move the internal lens 112 for the specified value. Although the driver 17 of this embodiment is an arc motor, any drive means, such as a ultrasonic motor, which can reciprocate the internal lens 112 may be employed.

The objective lens portion 11, compensator 12, beam splitter 13 and eyepiece portion 14 in combination constitute a telescopic optical system, and the linear sensor 15 functions as a photo-electric transducer.

The remaining portion of the electronic level 1 and the arrangement of the leveling staff 2 are identical to those of the first embodiment shown in FIG. 1 and FIG. 2, and explanation thereof is not repeated.

Figure 14:
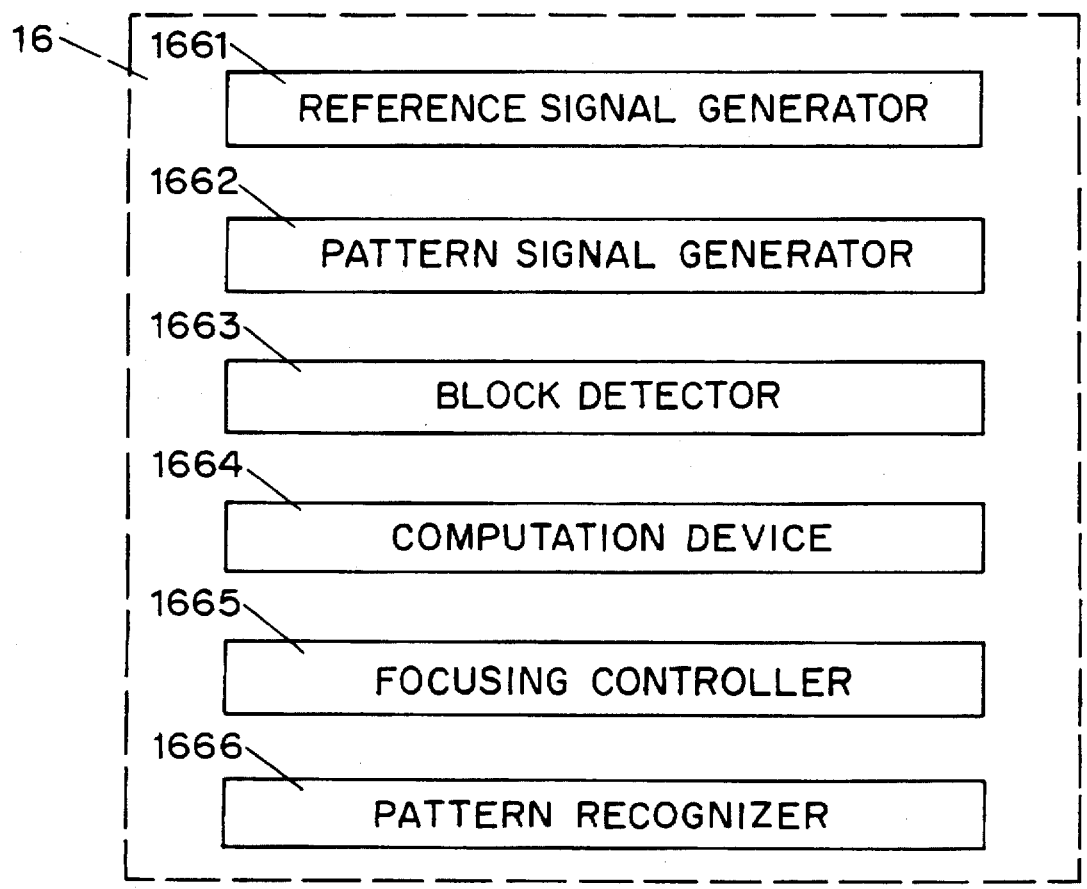
FIG. 14 is a block diagram showing the arrangement of the computation means 16 based on the third embodiment of invention.

Next, the functions of the microcomputer 166 will be explained with reference to FIG. 14. The computation means 16 consists of a reference signal generator 1661, a pattern signal generator 1662, a block detector 1663, an computation portion 1664, a focusing controller 1665, and a pattern recognizer 1666.

The focusing controller 1665 implements the Fourier transformation for the electrical signal produced by the linear sensor 15 and controls the driver 17 so that the output level of Fourier transformation is maximal. For the Fourier transformation, the function of fast Fourier transformation of the reference signal generator 1661 may be used. Namely, the computation means 16 includes the function of signal processor.

Figure 4:
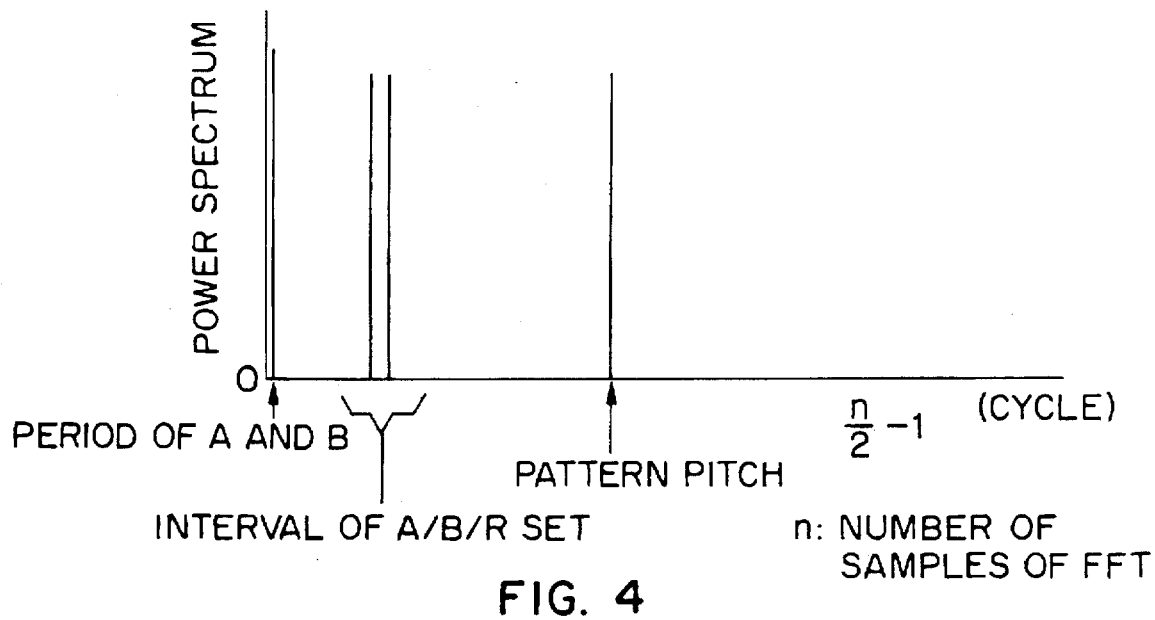
FIG. 4 is a graph showing the power spectrum of the output signal of the first embodiment of invention.

The principle of the focusing control performed by the focusing controller 1665 will be explained. The leveling staff 2 has an alignment of scale patterns at a constant pitch p, with each scale pattern being modulated in width. Scale patterns are read by the linear sensor 15. The output signal is rendered the Fourier transformation, and a power spectrum as shown in FIG. 4 of the first embodiment is produced.

On the graph with the frequency plotted on the horizontal axis, peaks appear at $nh/(p/d \times f)$ cycle/n bit where p is the pattern pitch of the leveling staff 2, d is the distance between the electronic level 1 and leveling staff 2, f is the focal distance of the optical system of the electronic level 1, n is the number of bits of the one-dimensional sensor which performs the Fourier transformation, and h is the bit interval of the sensor.

The peak value falls as the objective lens system moves off the in-focus position. Accordingly, the focusing operation takes place so as to detect the peak value.

The pattern recognizer 1666 performs the pattern matching in searching for a pattern image of the leveling staff 2 based on the power spectrum.

The remaining portion of the computation means 16 is identical to that of the first embodiment, and explanation thereof is not repeated.

Figure 15:
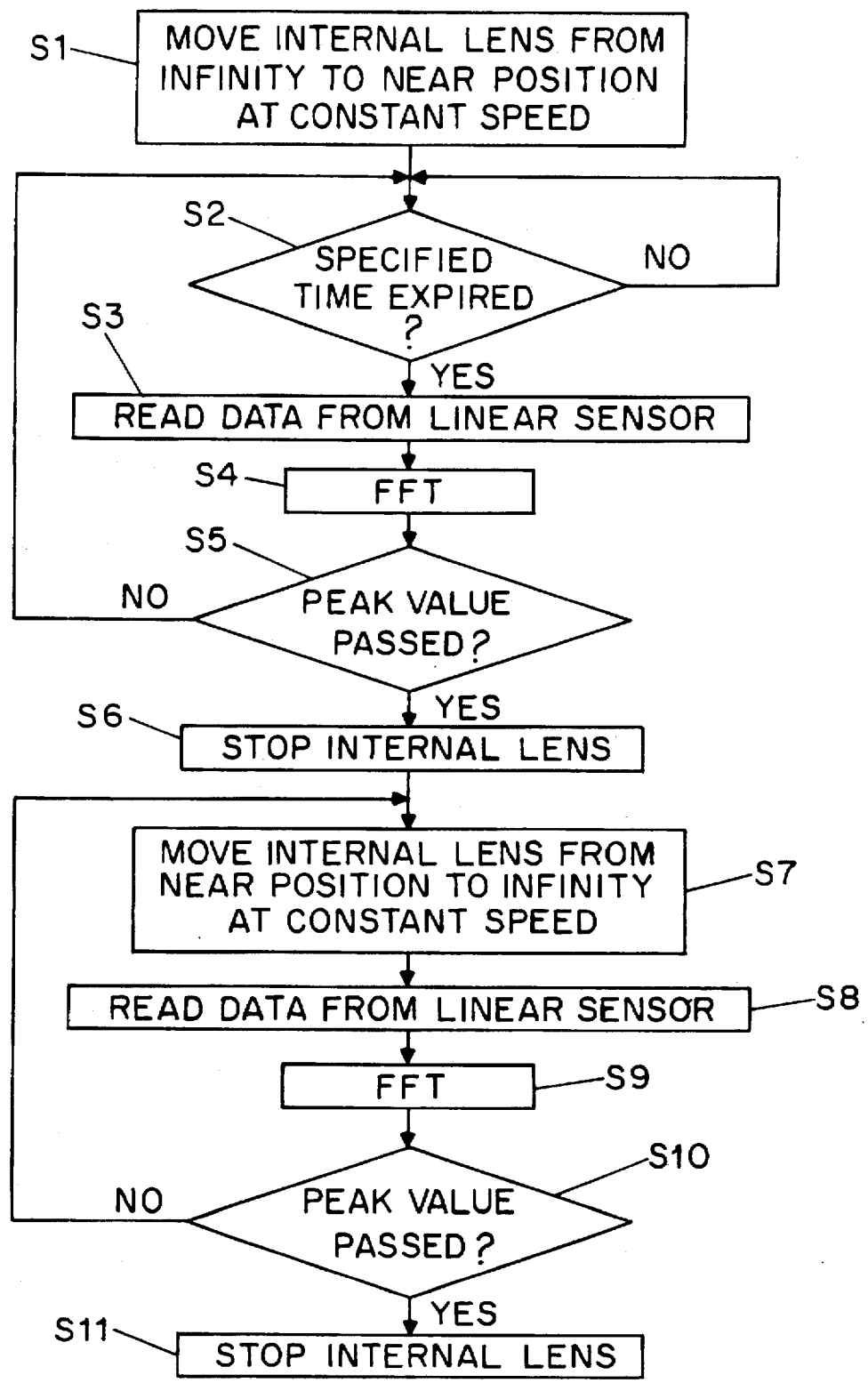
FIG. 15 is a flowchart showing the focusing control based on the third embodiment of invention.

Next, the focusing operation based on this embodiment will be explained on the flowchart of FIG. 15.

In step 1, the focusing controller 1665 in the computation means 16 operates on the driver 17 to move the internal lens 112 from its infinity position toward the nearer position at a certain speed. Step 2 judges the expiration of a prescribed time length, and on detecting the time expiration, data is fetched from the linear sensor 15 in step 3. In step 4, the computation means 16 implements the Fourier transformation for the data, and the result is compared with the previous result in step 5 thereby to judge whether or not the output level of Fourier transformation has passed the peak value. If the passage of the peak value is detected in step 5, the sequence proceeds to step 6, in which the focusing controller 1665 operates on the driver 17 to stop the internal lens 112, or otherwise the sequence returns to step 2.

After the internal lens 112 is stopped in step 6, the focusing controller 1665 operates on the driver 17 to move the internal lens 112 toward the infinity position at a certain speed in step 7. In the next step 8, data is fetched from the linear sensor 15, and it is rendered the Fourier transformation by the computation means 16 in step 9. Step 10 compares the result with the previous result thereby to judge whether or not the output level of Fourier transformation has passed the peak value. On detecting the passage of the peak value in step 10, i.e., the detection of in-focus state, the focusing controller 1665 operates on the driver 17 to stop the internal lens 112 in step 11, or otherwise the sequence returns to step 7 to continue the focusing operation.

In this manner, the leveling apparatus based on the third embodiment of this invention is capable of focusing the scale pattern of leveling staff by detecting the peak value of the Fourier transformation output.

[Variant of Third Embodiment]

Figure 16:
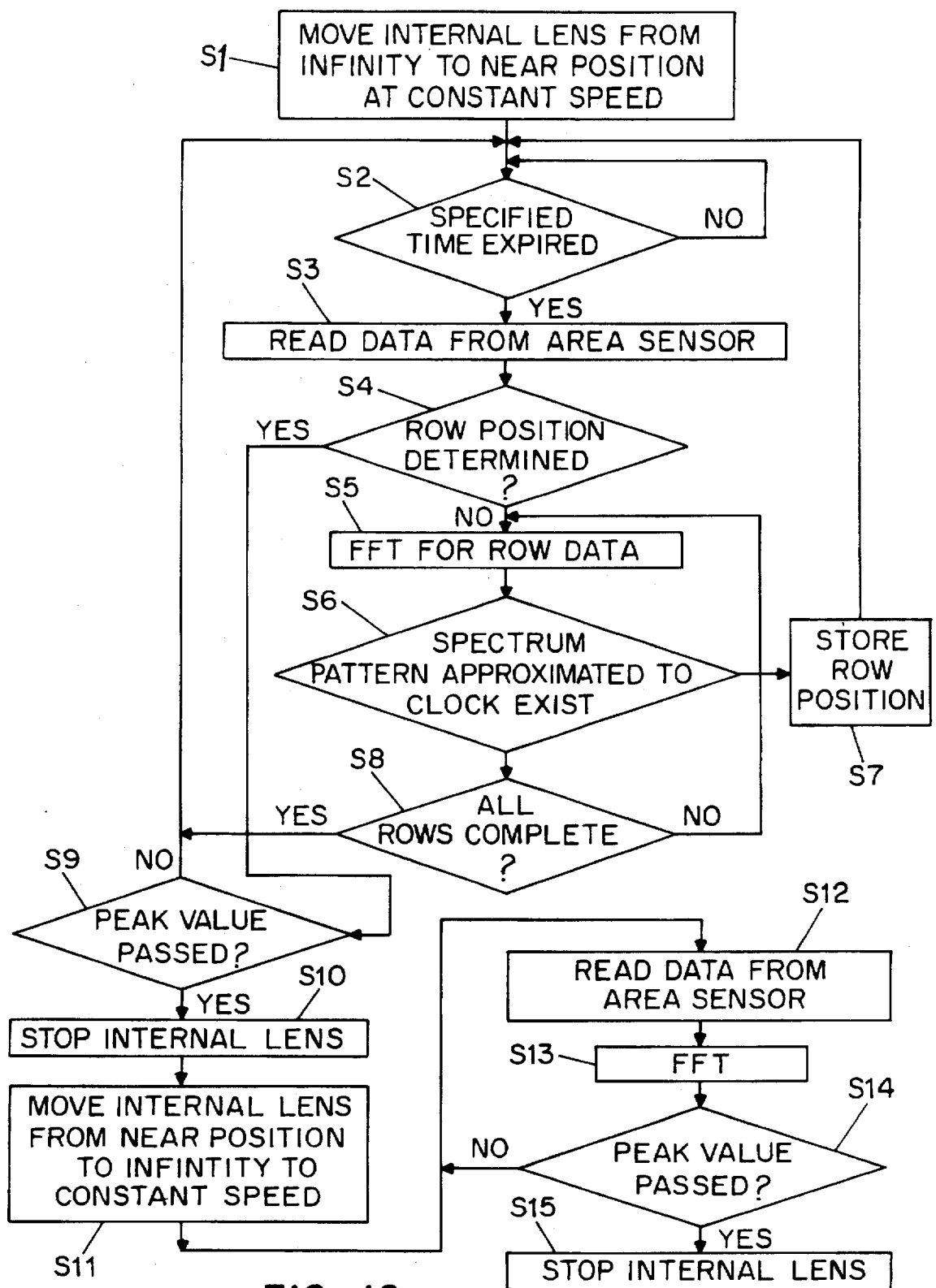
FIG. 16 is a flowchart showing the focusing control based on a variant of the third embodiment of invention.

A variant embodiment derived from the third embodiment, in which the linear sensor 15 is replaced with an area sensor 151, will be explained on the flowchart of FIG. 16.

In step 1, the focusing controller 1665 in the computation means 16 operates on the driver 17 to move the internal lens 112 from its infinity position toward the nearer position at a certain speed. Step 2 judges the expiration of a prescribed time length, and on detecting the time expiration, data is fetched from the area sensor 151 in step 3. Step 4 judges whether or not the row of the area sensor 151, where the pattern image of the leveling staff is present, has been determined. If the row of sensor is not yet determined in step 4, the sequence proceeds to step 5, in which the computation means 16 fetches data of one row and implements the Fourier transformation for it. In step 6, the pattern recognizer 1666 in the computation means 16 judges whether or not a power spectrum which is the approximation of the clock exists. Namely, it is judged based on the pattern recognition technique as to whether or not the power spectrum resulting from the pattern image of the leveling staff 2 as shown in FIG. 4 appears. On detecting the power spectrum in concern by the pattern recognizer 1666 in step 6, the row data of area sensor 151 is stored in the RAM 164 in step 7, and the sequence returns to step 2.

If the power spectrum in concern is not detected in step 6, the sequence proceeds to step 8 to test whether or not all rows have been examined. On completion of verification of all rows in step 8, the sequence returns to step 2, or otherwise the sequence returns to step 5.

Following the judgment of the determination of the row of sensor in step 4, the sequence proceeds to step 9 to judge whether or not the output level of Fourier transformation has passed the peak value based on comparison with the previous data. On detecting the passage of the peak value in step 9, the focusing controller 1665 operates on the driver 17 to stop the internal lens 112 in step 11, or otherwise the sequence returns to step 2.

After the internal lens 112 is stopped in step 10, the focusing controller 1665 operates on the driver 17 to move the internal lens 112 toward the infinity position at a low speed in step 11. This lens movement is slower than the operation of step 1 with the intention of precise focus adjustment. In the next step 12, data is fetched from the area sensor 151, and it is rendered the Fourier transformation by the computation means 16 in step 13. Step 14 compares the result with the previous result thereby to judge whether or not the output level of Fourier transformation has passed the peak value. On detecting the passage of the peak value in step 14, i.e., the detection of in-focus state, the focusing controller 1665 operates on the driver 17 to stop the internal lens 112 in step 15, or otherwise the sequence returns to step 12 to continue the focusing operation.

In this manner, the leveling apparatus based on this variant embodiment is capable of focusing the scale pattern of leveling staff by detecting the peak value of the Fourier transformation. It is designed to obtain an approximate focal position based on the output level of Fourier transformation conducted in coarse steps, and thereafter implement the precise focus adjustment based on the output level of Fourier transformation conducted in fine steps, whereby the focusing control completes in a short time.

In this variant embodiment, the focusing controller 1665 operates on the basis of assumption by linear approximation of the peak value from the output level of Fourier transformation. It is also operative by using only the modulated first and second patterns A and B, excluding the third pattern R, and distinguishing the signals of these patterns based on their wavelengths.

The foregoing third embodiment and the variant thereof implement the numerical computation processes, which are based on the conventional technique except for the focusing control, and further explanation is omitted.

The electronic leveling apparatus of the foregoing third embodiment is designed to measure the height difference automatically through the sighting of the leveling staff on which scale patterns are aligned at a constant pitch along the length measuring direction. In the apparatus, the telescopic optical system forms the scale pattern image, the photoelectric transducer converts the pattern image into a signal, and the focusing portion forms the pattern image on the photo-electric transducer. The signal processor implements the Fourier transformation for the transducer output signal and the focusing portion is controlled based on the output of the signal processor. The apparatus performs the automatic focusing control by merely having an additional driver in the focusing portion, instead of needing a separate focusing unit, whereby the structure is simplified and the manufacturing cost is reduced.

The apparatus of the third embodiment may be modified so that the focusing controller operates based on the output of signal processor which is produced through the movement of the focal position from a far position to a near position or from a near position to a far position by the focusing portion.

The focusing controller of the third embodiment may be modified so that an approximate focal position is obtained based on the output level of Fourier transformation conducted in coarse steps and thereafter fine focus adjustment is carried out based on the output level of Fourier transformation conducted in fine steps.

The focusing controller of the third embodiment may be modified to operate on the basis of the assumption by linear approximation of the peak value from the output level of signal processor.

[Fourth Embodiment]

Figure 17:
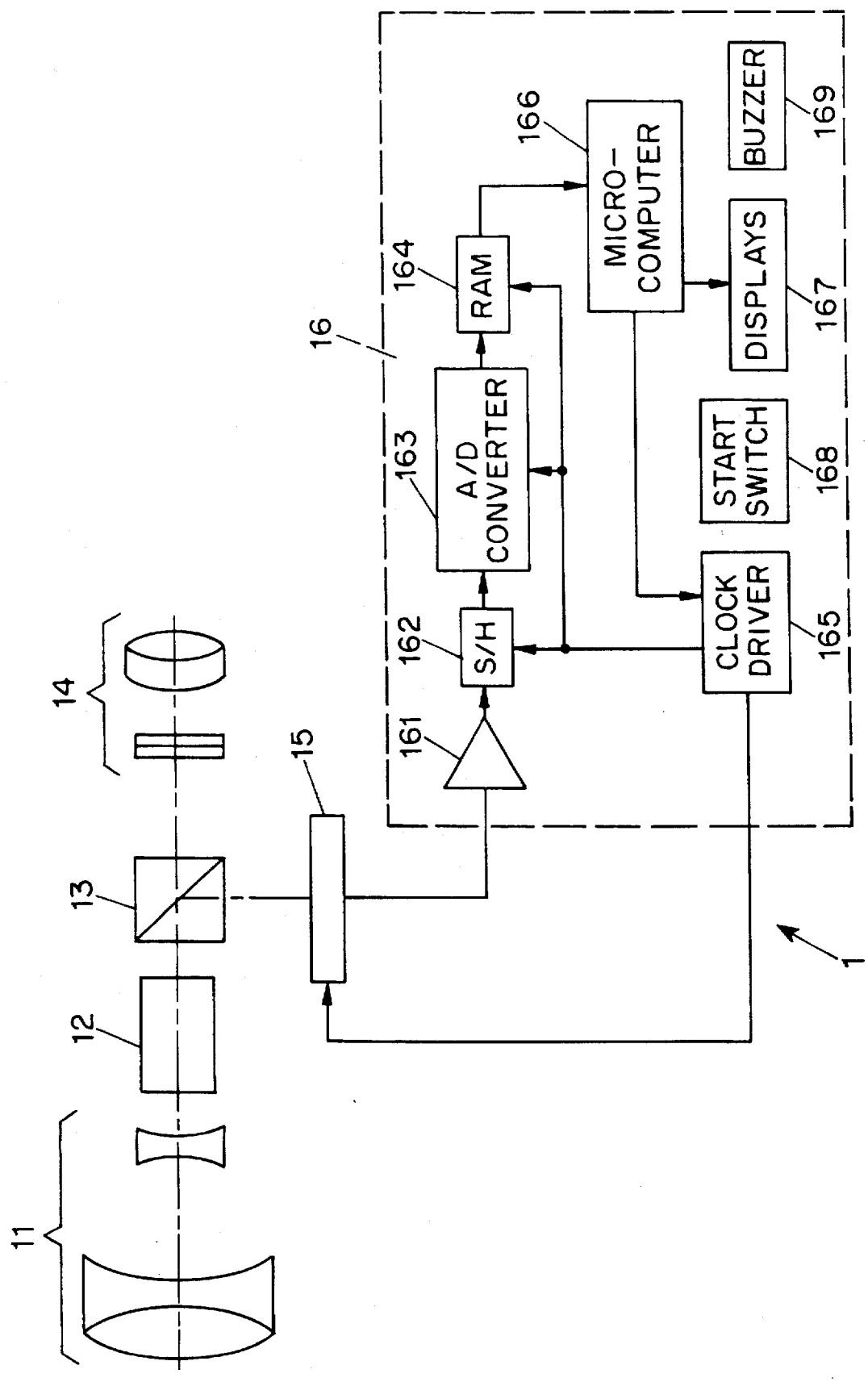
FIG. 17 is a block diagram showing the arrangement of the electronic level 1 based on the fourth embodiment of this invention.

The fourth embodiment of this invention will be explained with reference to the drawings. The apparatus of this embodiment consists of an objective lens portion 11, a compensator 12, a beam splitter 13, an eyepiece portion 14, a linear sensor 15, and a computation means 16, as shown in FIG. 17.

The objective lens portion 11 forms the image of scale patterns of the leveling staff 2, and the image is focused through the movement of an internal lens in the objective lens portion 11.

The computation means 16 consists of an amplifier 161, a sample-and-hold circuit 162, an A/D converter 163, a RAM 164, a clock driver 16, a microcomputer 166, a display portion 167, a measurement start switch 168 and a buzzer 169. The measurement start switch 168 functions as a measurement start command input means, and it initiates the computation means 16 to start the measurement in response to the operator's action. The measurement start command input means is not confined to a switch portion, but any input means capable of initiating the computation means 16 may be used.

The remaining portion of this embodiment and the arrangement of the leveling staff are identical to those of the first embodiment shown in FIG. 1 and FIG. 2, and explanation thereof is not repeated.

Figure 18:
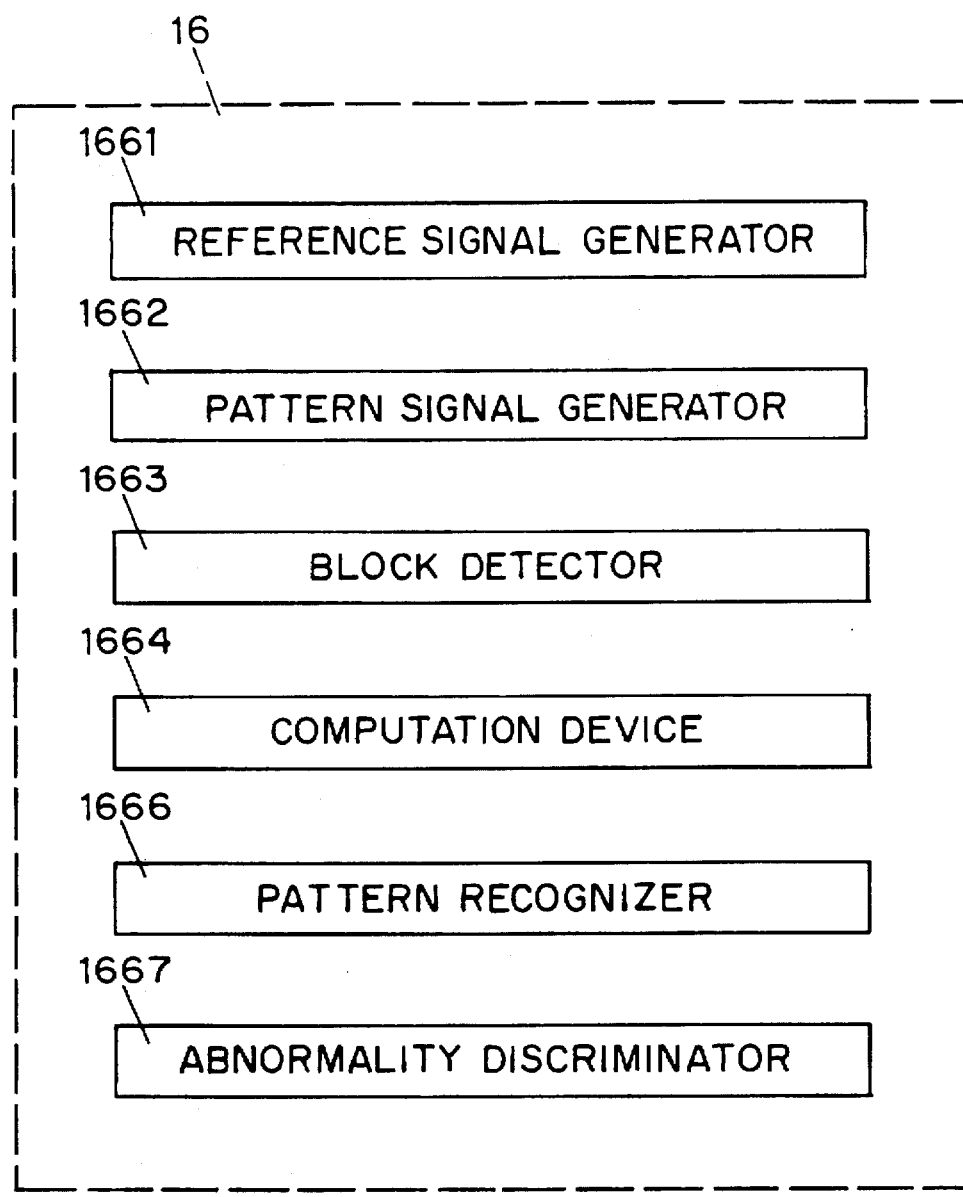
FIG. 18 is a block diagram showing the arrangement of the computation means 16 based on the fourth embodiment of invention.

Next, the functions of the microcomputer 166 will be explained with reference to FIG. 18. The computation means 16 consists of a reference signal generator 1661, a pattern signal generator 1662, a block detector 1663, a computation portion 1664, a pattern recognizer 1666, and an abnormality discriminator 1667.

When the measurement start switch 168 is activated, the abnormality discriminator 1667 operates to detect abnormality in the output of Fourier transformation produced by the reference signal generator 1661 and activate the display portion 167 and buzzer 169 thereby to notify the occurrence of abnormality.

The principle of abnormality detection by the abnormality discriminator 1667 will be explained. The leveling staff 2 has an alignment of scale patterns at a constant pitch p, with each scale pattern being modulated in width. Scale patterns are read by the linear sensor 15. The output signal is rendered the Fourier transformation, and a power spectrum as shown in FIG. 4 of the first embodiment is produced.

On the graph with the frequency plotted on the horizontal axis, peaks appear at $nh/(p/d \times f)$ cycle/n bit where p is the pattern pitch of the leveling staff 2, d is the distance between the electronic level 1 and leveling staff 2, f is the focal distance of the optical system of the electronic level, n is the number of bits of the one-dimensional sensor which performs the Fourier transformation, and h is the bit interval of the sensor.

In case a position of the leveling staff other than the specified position is sighted, frequencies at which peaks appear will vary on the spectrum pattern. Accordingly, the sight deviation on the leveling staff can be detected based on the pattern recognition of the spectrum pattern.

In case the pattern image becomes out-focused, the Fourier transformation output will fall, and accordingly the focus error for the leveling staff can be detected automatically based on the output level.

In response to the detection of abnormality by the abnormality discriminator 1667, it is displayed on the display portion 167 and the buzzer 169 is activated. It is possible for the display portion 167 to indicate the sight error and focus error distinguishably. Any other alarming portion may be used in place of the display portion and buzzer.

The remaining portion of the arrangement of the computation means 16 is identical to the first and third embodiments, and explanation thereof is not repeated.

In operation, when the operator presses the measurement start switch 168, the computation means 16 starts operating. The reference signal generator 1661 implements the fast Fourier transformation for the signal produced by the linear sensor 15 thereby to form a spectrum pattern.

Subsequently, the pattern recognizer 1666 is activated, and the integrity of the spectrum pattern resulting from the pattern recognition is judged by the abnormality discriminator 1667. On detecting a sight deviation based on the spectrum pattern by the abnormality discriminator 1667, it is displayed on the display portion 167 and the buzzer 169 is activated.

The abnormality discriminator 1667 assesses the output level of Fourier transformation provided by the reference signal generator 1661 and, if the output level is below a certain level, displays an abnormality message on the display portion 167 and activates the buzzer 169.

If, on the other hand, the abnormality discriminator 1667 does not detect the abnormality, the computation means 16 commences the calculation of height difference. The manner of numerical computation is identical to the conventional one explained previously, and explanation thereof is not repeated.

The apparatus of the fourth embodiment may be modified to use only the modulated first and second patterns A and B, excluding the third pattern R, and distinguish the signals of these patterns based on their wavelengths. Namely, a leveling staff having two kinds of periodic patterns may be used in place of the leveling staff having three kinds of periodic patterns.

The electronic leveling apparatus of the foregoing fourth embodiment is designed to measure the height difference automatically through the sighting of the leveling staff on which scale patterns are aligned at a constant pitch along the length measuring direction. In the apparatus, the telescopic optical system forms the scale pattern image, the photoelectric transducer converts the pattern image into a signal, and the signal processor implements the Fourier transformation for the transducer output signal. The measuring operation is started by the measurement start command input means in response to the action taken by the operator. The computation portion calculates the height difference based on the output of Fourier transformation provided by the signal processor, the abnormality discriminator operates to detect abnormality in the output of Fourier transformation at the initiation of the measurement start command input means, and the indicator means indicates the result of abnormality discrimination, whereby abnormality of Fourier transformation output can be detected automatically.

The leveling staff having an alignment of scale patterns at a constant pitch along the length measuring direction has at least two periodic patterns formed at a specified ratio to be imaged by the telescopic optical system. The abnormality discriminator detects the insufficiency of the output level of Fourier transformation provided by the signal processor, and discriminates the abnormality based on the presence or absence of two spectrum patterns of the specified ratio, whereby the sight error and focus error can be detected automatically thereby to prevent the incorrect measurement.

What is claimed is:

1. A leveling staff for use in measuring a difference in height between a starting position on said staff and a point of intersection with said staff of a line of sight of an electronic leveling apparatus, said leveling staff comprising:

a first pattern which is modulated in a first cyclic period relative to said starting position and a second pattern which is modulated in a second cyclic period, different from said first period, relative to said starting position, said first and second patterns being aligned at a constant pitch along a length of said staff.

2. The leveling staff according to claim 1 wherein said first and second patterns are aligned alternately along said length of said staff.

3. The leveling staff according to claim 1, wherein said first and second patterns have pattern widths which vary throughout said cyclic periods.

4. The leveling staff according to claim 1 further comprising a third pattern having a constant width, said first, second and third patterns being aligned alternately at said constant pitch along said length of said staff.

5. An electronic leveling apparatus for operating with said leveling staff according to claim 1, 2, 3 or 4, said apparatus comprising:

a pattern detector which detects a pattern image, including said first and second patterns, of said leveling staff encompassing said point of intersection and converts said pattern image into a detector signal having a period representative of said constant pitch;

a reference signal generator which produces a reference signal based on said period of said detector signal;

a pattern signal generator which produces a first pattern signal and a second pattern signal from the reference signal and the detector signal; and a computation portion which calculates said difference of height based on the phases of the first and second pattern signals.

6. An electronic leveling apparatus for operating with the leveling staff according to claim 1, 2, 3 or 4, said apparatus comprising:

a pattern detector which detects a pattern image, including said first and second patterns, of said leveling staff encompassing said point of intersection and converts said pattern image into a detector signal having a period representative of said constant pitch;

a reference signal generator which produces a reference signal based on said period of said detector signal;

a pattern signal generator which produces a first pattern signal and a second pattern signal from the reference signal and the detector signal, said pattern signals having modulation components;

a block detector which identifies a pattern block encompassing said point of intersection based on levels of said modulation components of said first and second pattern signals; and a computation portion which calculates said difference of height based on said identified pattern block.

7. An electronic leveling apparatus for operating with the leveling staff according to claim 1, 2, 3 or 4, said apparatus comprising:

a pattern detector which detects a pattern image, including said first and second patterns, of said leveling staff encompassing said point of intersection and converts said pattern image into a detector signal having a period representative of said constant pitch;

a reference signal generator which produces a reference signal based on said period of said detector signal;

a distance measuring means for measuring a distance from said electronic leveling apparatus to said leveling staff based on said reference signal;

a pattern signal generator which produces a first pattern signal and a second pattern signal from the reference signal and the detector signal, said pattern signals having modulation components;

a block detector which identifies a pattern block encompassing said point of intersection based on levels of said modulation components of said first and second pattern signals; and a computation portion which calculates said difference of height based on the phases of the first and second pattern signals if said measured distance is greater than a predetermined value or based on said identified pattern block if said measured distance is equal to or less than said predetermined value.

8. An electronic leveling apparatus for operating with the leveling staff according to claim 1, 2 3 or 4, said apparatus comprising:

a pattern detector which detects a pattern image, including said first and second patterns, of said leveling staff encompassing said point of intersection and converts said pattern image into a detector signal having a period representative of said constant pitch;

a reference signal generator which produces a reference signal based on said period of said detector signal;

a pattern signal generator which produces a first pattern signal, second pattern signal and third pattern signal from said detector signal based on said reference signal;

a pattern discriminator which discriminates said first and second pattern signals based on said third pattern signal; and a computation portion which calculates said difference of height based on the phases of said first and second pattern signals.

9. An electronic leveling apparatus for automatically measuring a difference of height between a starting position on a leveling staff and a point of intersection with said staff of a line of sight of said electronic leveling apparatus, said staff having patterns aligned alternately at a constant pitch along a length of said staff, said apparatus comprising:

a telescopic optical system including a focusing optical system for forming a pattern image;

a photo-electric transducer which converts said pattern image into an electrical signal;

a focusing portion which forms said pattern image on said photo-electric transducer;

a signal processor which implements the Fourier transformation for said electrical signal; and a focusing controller which controls said focusing portion in response to an output level of said Fourier transformation.

10. The electronic leveling apparatus according to claim 9, wherein said focusing controller implements said focusing control based on said output level of said Fourier transformation resulting from movement, by said focusing portion, of a focal position from a far position to a near position or from a near position to a far position.

11. The electronic leveling apparatus according to claim 9, wherein said focusing controller determines an approximate in-focus position based on said output level of said Fourier transformation conducted in coarse steps, and thereafter implements a fine focus adjustment based on said output level of said Fourier transformation conducted in fine steps.

12. The electronic leveling apparatus according to claim 9, wherein said focusing controller implements said focusing control through an assumption of an output peak based on a linear approximation resulting from said output level of said Fourier transformation.

13. An electronic leveling apparatus for automatically measuring a difference of height between a starting position on a leveling staff and a point of intersection with said staff of a line of sight of said electronic leveling apparatus, said staff having patterns aligned alternately at a constant pitch along a length of said staff, said apparatus comprising:

a telescopic optical system for forming a pattern image;

a photo-electric transducer for converting said pattern image into an electrical signal;

a signal processor for implementing the Fourier transformation for said electrical signal;

measurement start command input means for starting a measurement responsive to an operator action;

a computation portion which calculates said difference in height based on an output level of said Fourier transformation;

an abnormality discriminator for detecting abnormality in said output level of said Fourier transformation after activation of said measurement start command means; and an indication means for indicating a result of detection by said abnormality discriminator.

14. The electronic leveling apparatus according to claim 13, wherein said leveling staff has at least two periodic patterns formed at a specified ratio and wherein said abnormality discriminator operates to judge a deficiency in said output level of Fourier transformation provided by said signal processor and to discriminate said abnormality depending on a presence or absence of two spectrums having said specified ratio.

15. The electronic leveling apparatus according to claim 13 or 14, wherein said indication means comprises a display portion or an acoustic alarm portion.

* * * * *

UNITED STATES PATENT AND TRADEMARK OFFICE
CERTIFICATE OF CORRECTION

PATENT NO. : 5,742,378
DATED : April 21, 1998
INVENTOR(S) : Kumagai et al.

Figure 7A:
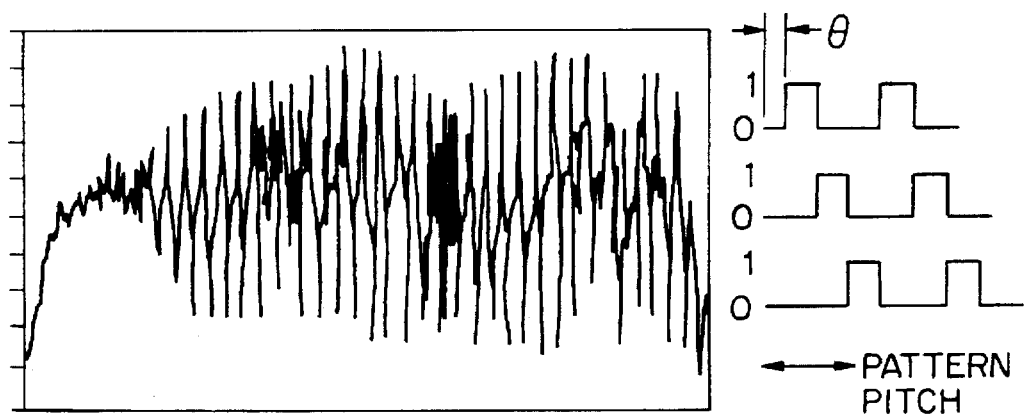
Figure 7B:
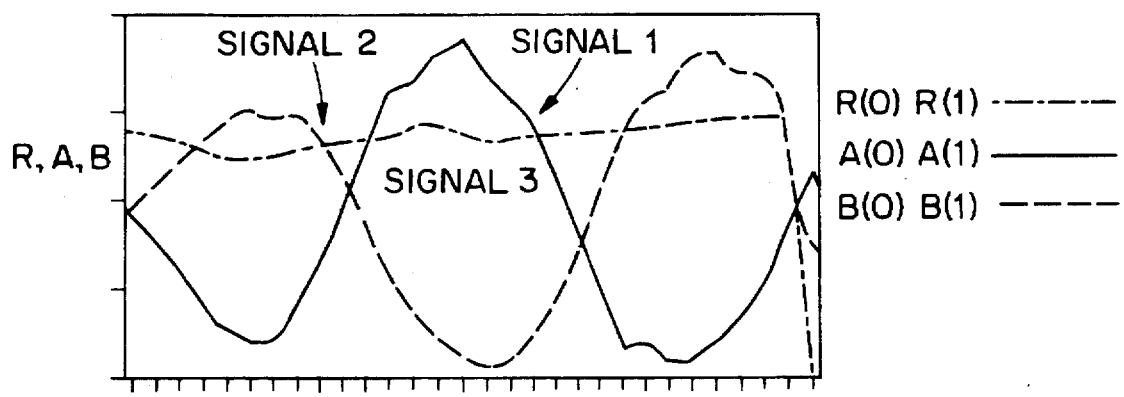

It is certified that error appears in the above-identified patent and that said Letters Patent is hereby corrected as shown below:

Column 5, line 8, in Equation 7, "sin" should read --$sin^{-1}$--;

Column 2, line 1, "Fig. 7" should read --Figs. 7(a)-(b)--;

Column 3, line 2, "Fig. 2" should read --Figs. 2(a) and 2(b)--;

Column 3, line 18, "Fig. 2(b)" should read --Fig. 2(c)--;

Column 4, line 49, "Fig. 7" should read --Figs. 7(b)-(c)--;

Column 11, line 41, "Fig. 2" should read --Figs. 2(a)-(c)--;

Column 14, line 44, "Fig. 1 and Fig. 2" should read --Fig. 1 and Figs. 2(a)-(c)--;

Signed and Sealed this

First Day of June, 1999

*Attest:*

Q. TODD DICKINSON

*Attesting Officer*     *Acting Commissioner of Patents and Trademarks*